United States Patent

[11] 3,572,492

[72] Inventor Werner Dreszig
 Saint Margrethen, Switzerland
[21] Appl. No. 782,507
[22] Filed Nov. 4, 1968
[45] Patented Mar. 30, 1971
[73] Assignee Bauwerk AG
 St. Margrethen, Switzerland
[32] Priority Nov. 7, 1967
[33] Switzerland
[31] 15523/67

[54] APPARATUS FOR ALIGNING PARQUET STRIPS IN THE SAME DIRECTION
 8 Claims, 3 Drawing Figs.
[52] U.S. Cl. .................................................. 198/30,
 198/32, 198/33
[51] Int. Cl. ..................................................... B65g 47/24,
 B65g 47/26
[50] Field of Search ............................................ 198/30, 32,
 33 (R), 106; 52/749

[56] References Cited
 UNITED STATES PATENTS
 1,208,802 12/1916 Lienau ........................ 198/30X
 3,056,482 10/1962 Lanham ....................... 198/30

FOREIGN PATENTS
835,320 5/1960 Great Britain................ 198/30

Primary Examiner—Edward A. Sroka
Attorney—Werner W. Kleeman

ABSTRACT: There is disclosed an apparatus for aligning parquet strips in the same direction and which is of the type comprising chute means equipped with a plurality of adjacent or juxtapositioned channels for receiving the parquet strips. A jolting mechanism cooperates with the chute means for aligning the parquet strips which have been randomly received upon the chute means and further serves to convey such parquet strips along the chute means. A transfer table is disposed at the discharge end of the chute means and removes the aligned parquet strips. Transverse extending stop means are arranged at the region of the discharge end of the chute means in front of the transfer table. The aligned parquet strips impact against such transverse extending stop means. Furthermore, means serve to periodically render inoperable the transverse extending stop means so that the parquet strips impacting thereagainst slide past such transverse extending stop means and onto the transfer table.

Patented March 30, 1971

INVENTOR
WERNER DRESZIG

BY Jacobi & Davidson

ATTORNEYS

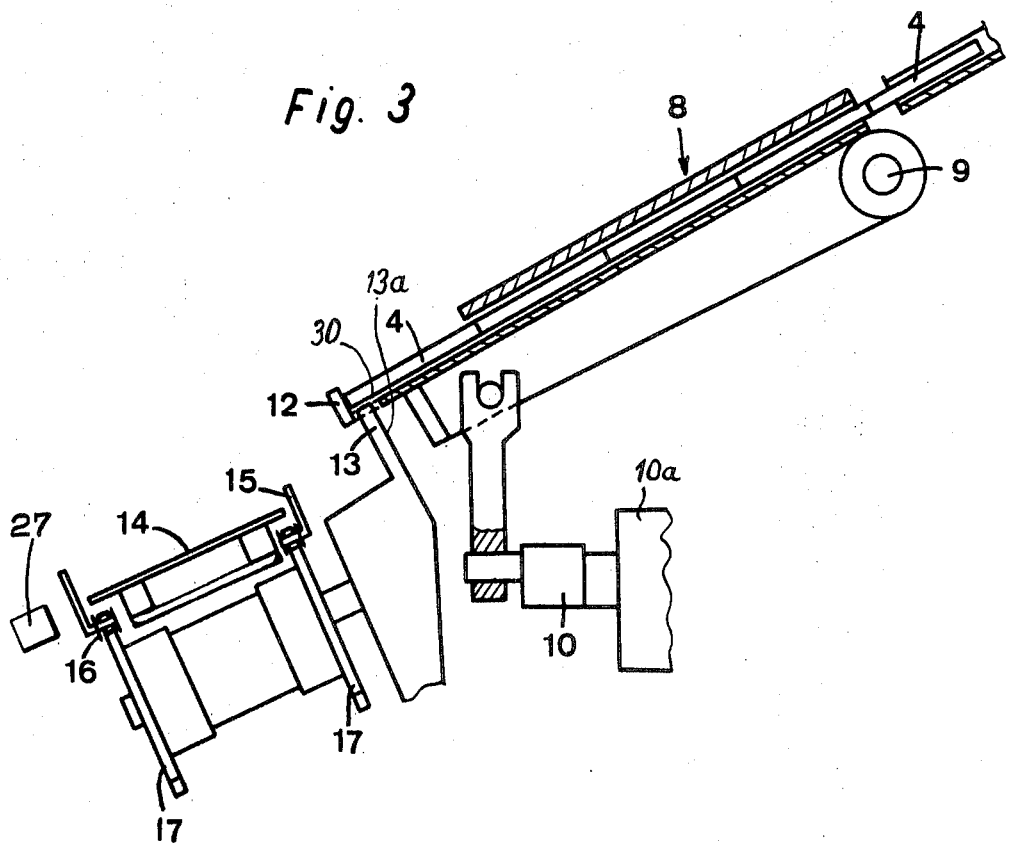

APPARATUS FOR ALIGNING PARQUET STRIPS IN THE SAME DIRECTION

BACKGROUND OF THE INVENTION

The present invention relates to a new and improved apparatus for aligning parquet strips or battens in the same direction. In its more specific aspects, such apparatus is of the type embodying a chute or slide possessing a number of adjacent channels for receiving the parquet strips, a jarring or jolting mechanism for aligning the parquet strips which have been delivered in random position and for further conveying same, a transfer table for transporting away the aligned parquet strips, and a transverse stop member mounted at the end of the channels in front of this transfer table and against which the aligned parquet strips impact.

Apparatuses of this type serve for the production of so-called mosaic parquet floors composed of groups of parquet strips or battens arranged in checkerboard fashion. In order to be able to produce this floor pattern the parquet strips which arrive in random arrangement must be aligned in the same direction. Thereafter, the thus aligned parquet strips are alternately turned through an angle of 90° to form the groups of parquet strips from which the mosaic parquet or inlay floor is formed.

The prior art is acquainted with manually operated slides or chutes which, however, possess the drawback that they only provide for a limited efficiency.

SUMMARY OF THE INVENTION

Accordingly, it is a primary object of the present invention to overcome the aforementioned drawbacks of the prior art constructions.

Another, more specific object of this invention relates to an improved apparatus for aligning parquet strips in the same direction which provides for an increased efficiency and considerable automation of the aligning process.

Still a further significant object of the present invention relates to an improved apparatus for aligning parquet strips which is relatively simple in construction, economical to manufacture, quite easy to use, not readily subject to breakdown, provides for efficient and automatic aligning of the parquet strips into a desired direction, and considerably improves the economies associated with the fabrication of inlaid or parquet flooring.

Now, in order to implement these and still further objects of the invention, which will become more readily apparent as the description proceeds, the invention contemplates the provision of means for periodically placing out of operation the transverse extending stop means, so that the parquet strips which impact against such stop means will simultaneously slide past such stop means and onto the transfer table or the like. Through the provision of this aspect of the invention it is possible to mechanize the aligning of the parquet strips in the same direction, without the necessity of having to use a mechanism which is subject to breakdown or malfunction.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is an enlarged fragmentary view showing details of the lower portion of the chute or slide and its associated mechanism of the inventive aligning apparatus.

DESCRIPTION OF THE PREFERRED EMBODIMENT

Figure 2:
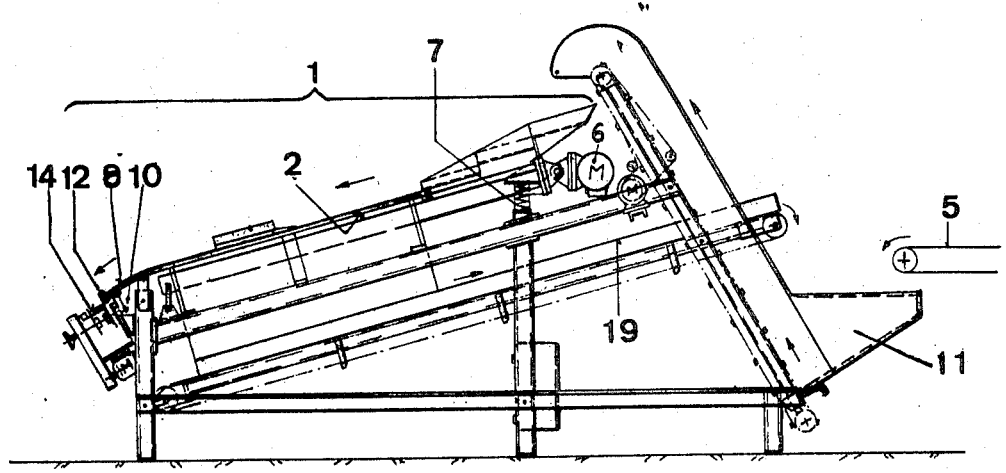
FIG. 2 is a schematic side view of the aligning apparatus shown in FIG. 1.

Describing now the drawings, the exemplary embodiment of inventive apparatus for aligning parquet strips or battens will be seen to comprise a slide or chute means 1 possessing a sheet metal base or bottom 2 which is inclined somewhat to the horizontal through an angle of about 15°. A number of juxtapositioned partition walls 3 are mounted at the base 2 of the chute means 1. It will be seen that partition walls 3 extend in substantial parallelism to one another from the top towards the bottom or discharge end of the chute means 1. The uppermost arranged partition walls 3 are spaced somewhat further from one another than the lower partition walls. The space between each two neighboring partition walls 3 defines a channel 3a, and it should be understood that the lowermost arranged partition walls 3 provide a free space or channel between themselves which only slightly exceeds the width of the parquet strips or battens 4. These channels 3a which are provided between the neighboring partition walls 3 for the parquet strips 4 which are to be aligned serve for the alignment of such parquet strips in the same direction so that thereafter they can be assembled together to form mosaic parquet blocks or sheets.

A conveyor means, here shown as an endless conveyor band 5, serves to infeed or deliver the parquet strips 4 in random position from a nonillustrated supply container or receptacle or from a preceding processing station into a collecting funnel 11. This collecting funnel 11 then deposits the parquet strips 4 in random position onto the bottom 2 of the chute means 1. A jarring or jolting mechanism, for instance a conventional vibrator 6, cooperates with the chute means 1 to impart a jolting or jarring motion to such chute means, so that the parquet strips 4 tend to slide into the channels 3a and will continuously slide down from the top infeed end of such chute means towards the lower discharge end thereof. A resilient buffer or shock absorber device 7 provides the resilient attachment for those components which are subjected to the jolting or jarring motion. Those parquet strips which do not fall between the partition walls 3 and thus into the channels 3a because they are in a transverse position or because they are lying on top of one another, either fall between the support surfaces for these channels towards the bottom or are ejected by a stripper impact member 20 onto a conveyor band 19 situated beneath the chute bottom or base 2. This conveyor band 19 again conveys the thus ejected parquet strips upwardly towards the infeed side of the apparatus and back into the collecting funnel 11.

Continuing, it will be observed that the lowermost chute portion 8 is pivotably mounted and can rock or pivot about a horizontal shaft member 9, as best observed by referring to FIG. 3. The rocking or pivotal motion of this lower chute portion 8 is produced by an eccentric mechanism 10 which is operably associated with a suitable schematically depicted drive motor 10a. A transverse extending stop member 12 is arranged at the lower discharge end of the chute portion 8. The parquet strips 4 which slide down along the chute from the top end thereof come to bear against this transverse extending stop member 12, so that their further downward movement is interrupted. Stationary arranged finger means 13 are located beneath the sheet metal bottom 2, and each such stationary finger means or member 13 can piercingly extend through a respective opening 30 provided for each channel 3a at the region of the transverse extending stop means 12.

A stationary transfer table 14 is located after, that is to say, downstream of the lower chute portion 8. The pivotal movement of the lower chute portion 8 is carried out in such a way that the finger members 13 tend to lift the lowermost parquet strip 4 of each channel 3a over the transverse extending stop means 12, so that, in each instance, a number of parquet strips 4 simultaneously arrive upon the transfer table 14.

Figure 1:
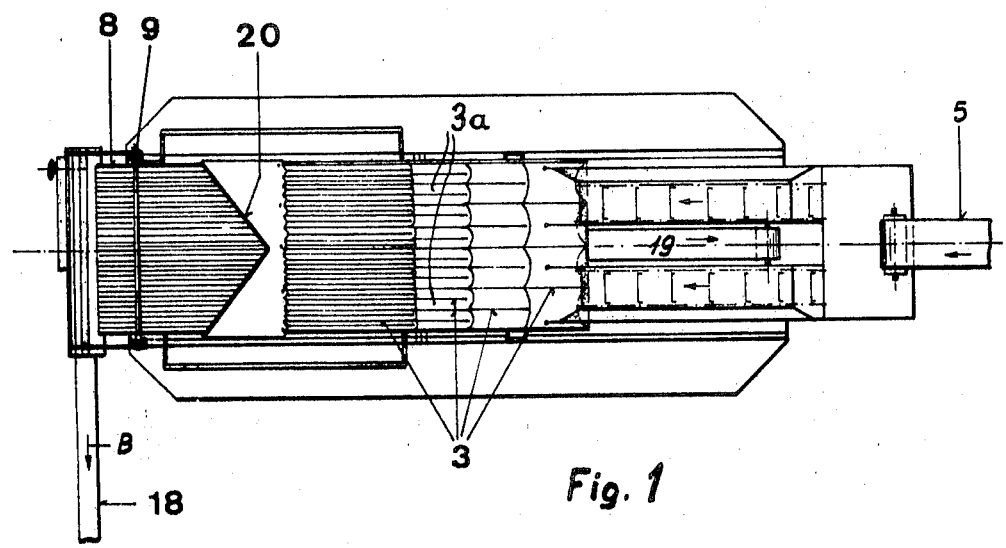
FIG. 1 is a schematic plan view of a preferred embodiment of inventive aligning apparatus for parquet strips.

Consequently, it is reliably prevented that the subsequent or trailing row of parquet strips will likewise arrive over the transverse stop means 12, since such row of parquet strips, even if the chute portion 8 has not yet been completely lowered, will tend to bear against the breast or face 13a of the finger members 13. The row of parquet strips 4 which have arrived at the slightly inclined transfer table 14 will be prevented from sliding downwards by impact member 27. The transfer of such row of parquet strips on the transfer table 14 and in a direction transverse to their direction of movement upon the chute means 1 advantageously takes place by means of two entrainment members 15 which are spaced from one another, as shown, and each of which is carried by an endless chain 16 which is trained about the chain gears 17. These chain gears 17 are preferably driven by the same drive motor which serves to drive the eccentric mechanism 10. Moreover, it will be seen that each entrainment member or means 15 and its associated endless chain 16 is arranged along the region of one lengthwise side of the transfer table 14. Through the action of the entrainment means 15 the entire row of parquet strips 4 is displaced in the direction of the arrow B FIG. 1 onto a conveyor band 18 or equivalent conveying device. The pivotal movement of the lower chute portion 8 and the movement of the endless chains 16, to which connected entrainment members 15 are rigidly connected, takes place rhythm with one another in a desired fashion or by using a synchronous or common drive. Thus, a certain time dependency exists between the movement of the endless chains 16 and the movement of the pivotal chute portion 8. Furthermore, in lieu of a single pair of entrainment members 15 it would also be possible to provide at the endless chains 16 a number of pairs of entrainment members. Release of the next group or series of parquet strips disposed upon the chute means only then occurs when that group of parquet strips disposed upon the transfer table has been transported away.

Furthermore, instead of providing a pivotally mounted chute portion, it would be possible to construct the finger means 13 to be movable up and down in order to raise the associated parquet strips 4 over and past the transverse extending stop means 12.

It should be apparent from the foregoing detailed description, that the objects set forth at the outset to the specification have been successfully achieved.

I claim:

1. Apparatus for aligning in the same direction parquet strips comprising chute means, means cooperating with said chute means for providing a plurality of juxtapositioned channels for receiving the parquet strips, a jolting mechanism for aligning the parquet strips randomly deposited upon said chute means and for conveying such parquet strips while disposed upon said chute means, a transfer table for removing the aligned parquet strips, transverse extending stop means disposed at an end region of said chute means in front of said transfer table and against which the aligned parquet strips impact, means for periodically rendering inoperable said transverse extending stop means, so that the parquet strips impacting against said transverse extending stop means slide past such transverse extending stop means and onto said transfer table, and excess returning means for returning to said chute means those strips which do not become aligned in said channels.

2. Apparatus for aligning in the same direction parquet strips comprising chute means, means cooperating with said chute means for providing a plurality of juxtapositioned channels for receiving the parquet strips, a jolting mechanism for aligning the parquet strips randomly deposited upon said chute means and for conveying such parquet strips while disposed upon said chute means, a transfer table for removing the aligned parquet strips, transverse extending stop means disposed at an end region of said chute means in front of said transfer table and against which the aligned parquet strips impact, means for periodically rendering inoperable said transverse extending stop means, so that the parquet strips impacting against said transverse extending stop means slide past such transverse extending stop means and onto said transfer table, a substantially horizontally extending shaft member, said chute means incorporating a lower chute portion which is mounted to be pivotable at said horizontally extending shaft member, the lowermost end of said lower chute portion defining said end region supporting said transverse extending stop means, and a stationary finger member operably associated with each parquet strip channel at the region of said transverse extending stop means, wherein during downward pivoting of said lower chute portion each stationary finger lifts the lowermost parquet strip in each associated channel over said transverse extending stop means.

3. Apparatus for aligning in the same direction parquet strips comprising chute means, means cooperating with said chute means for providing a plurality of juxtapositioned channels for receiving the parquet strips, a jolting mechanism for aligning the parquet strips randomly deposited upon said chute means and for conveying such parquet strips while disposed upon said chute means, a transfer table for removing the aligned parquet strips, transverse extending stop means disposed at an end region of said chute means in front of said transfer table and against which the aligned parquet strips impact, means for periodically rendering inoperable said transverse extending stop means, so that the parquet strips impacting against said transverse extending stop means slide past such transverse extending stop means and onto said transfer table, conveyor means cooperating with said transfer table, and transport means for conjointly displacing the parquet strips received upon said transfer table in a direction transverse to their longitudinal axes and onto said conveyor means.

4. Apparatus as defined in claim 3, wherein said conveyor means comprises a conveyor band.

5. Apparatus as defined in claim 3, wherein said transport means comprises a pair of endless chains provided with entrainment means and positioned to cooperate with said transfer table.

6. Apparatus as defined in claim 5, wherein each endless chain and associated entrainment means is positioned at the region of one lengthwise extending edge of said transfer table.

7. Apparatus as defined in claim 5, wherein said chute means includes a pivotably mounted lower chute portion, and wherein a time dependency exists between the movement of said endless chains and the movement of said pivotably mounted lower chute portion.

8. Apparatus for aligning in the same direction parquet strips comprising chute means having a discharge end portion, means cooperating with said chute means for providing a plurality of adjacently disposed channels for receiving the parquet strips, a jolting mechanism cooperating with said channels for aligning the parquet strips randomly deposited upon said chute means and for conveying such parquet strips while disposed upon said chute means towards said discharge end portion, a transfer table for receiving the aligned parquet strips coming from said chute means and for transporting them away, transverse extending stop means disposed at the region of said discharge end portion of said chute means in front of said transfer table and against which impact the aligned parquet strips, means for periodically rendering inoperable said transverse extending stop means, so that the parquet strips impacting against said transverse extending stop means slide past such transverse extending stop means and onto said transfer table, and means for receiving strips which move toward said discharge end portion without becoming aligned in said channels and for returning such strips to the input end of said chute means.